April 4, 1939.　　R. G. ANDERSON ET AL　　2,153,359
AIR FLOW CONTROL APPARATUS
Filed April 1, 1938　　3 Sheets-Sheet 1
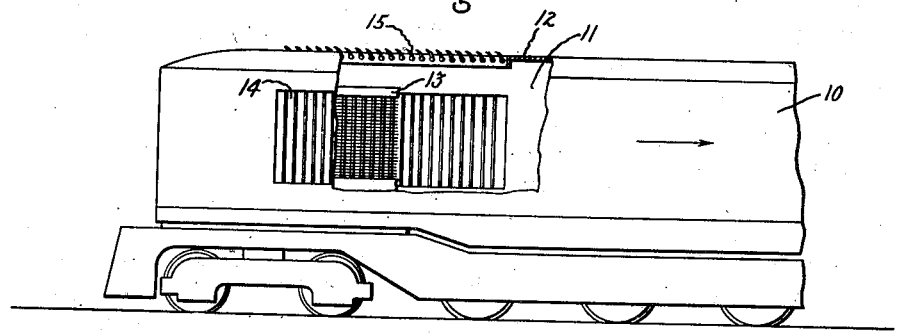
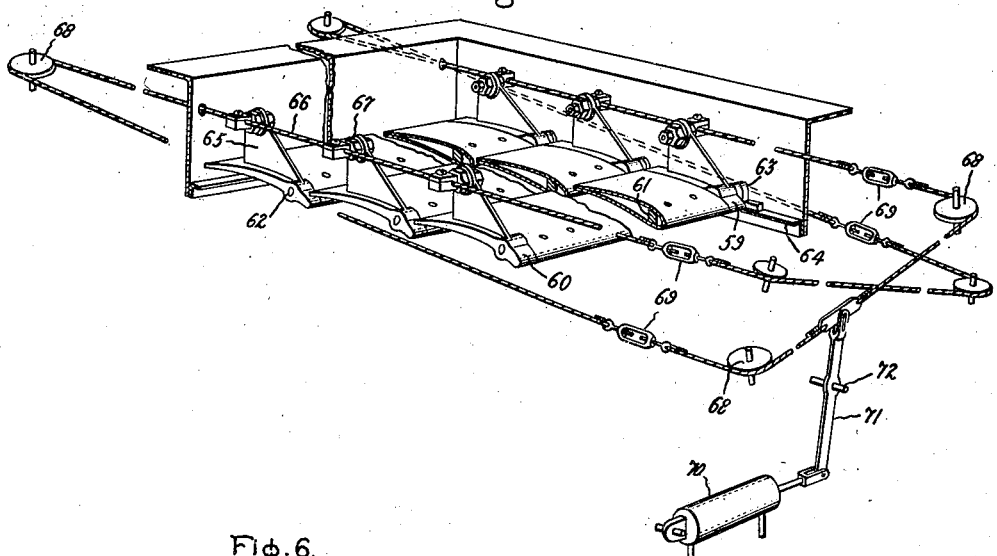
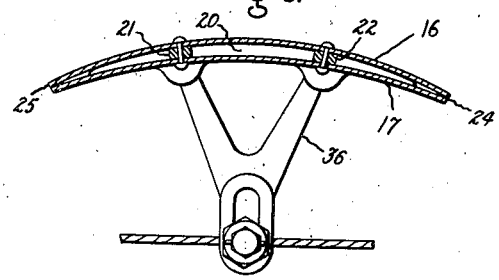
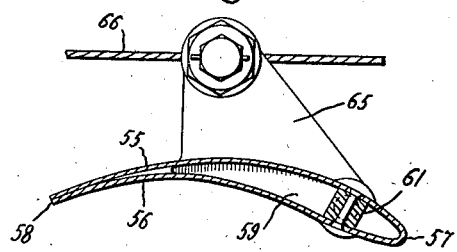
Inventors:
Robert G. Anderson,
Karl J. Ahnell,
Townsend Ralph Goldsmith,
by Harry E. Dunham
Their Attorney.

April 4, 1939.　　R. G. ANDERSON ET AL　　2,153,359
AIR FLOW CONTROL APPARATUS
Filed April 1, 1938　　3 Sheets-Sheet 2
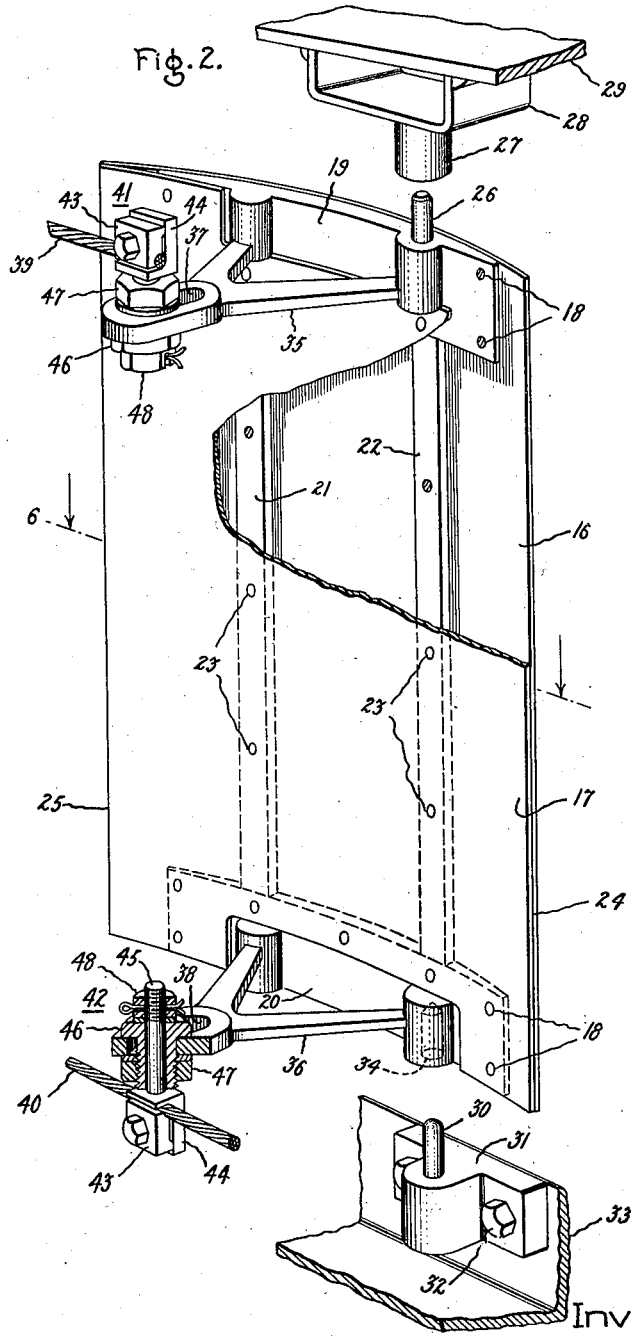
Inventors:
Robert G. Anderson,
Karl J. Ahnell,
Townsend Ralph Goldsmith,
by Harry E. Dunham
Their Attorney.

April 4, 1939.　　R. G. ANDERSON ET AL　　2,153,359
AIR FLOW CONTROL APPARATUS
Filed April 1, 1938　　3 Sheets-Sheet 3

Inventors:
Robert G. Anderson,
Karl J. Ahnell,
Townsend Ralph Goldsmith,
by Harry E. Dunham
Their Attorney.

Patented Apr. 4, 1939

2,153,359

UNITED STATES PATENT OFFICE 2,153,359

AIR FLOW CONTROL APPARATUS

Robert G. Anderson, Karl J. Ahnell, and Townsend R. Goldsmith, Erie, Pa., assignors to General Electric Company, a corporation of New York Application April 1, 1938, Serial No. 199,372

9 Claims. (Cl. 98—110)

This invention relates to air flow controllers for heat exchange apparatus. Although not limited thereto, the invention is especially applicable for use in connection with elastic fluid condenser cooling systems of turbine driven railway locomotives.

Elastic fluid power plants of locomotives designed for long run operation are usually provided with heat exchange apparatus of considerable capacity for properly reducing the exhaust pressure of the turbine. The heat exchangers or condensers are usually of the air cooled type, air being admitted through openings in the side walls of the locomotive adjacent the condenser units and exhausted from the rear of the units through suitable outlets usually provided in the roof of the locomotive cab structure. Because of the varying altitudes and weather conditions encountered by a train operated on a long run and due to variations in speed, the amount of cooling air for the condenser units must be regulated from time to time in accordance with the varying operating conditions in order to maintain the proper functioning of the heat exchange apparatus.

It is an object of this invention to provide a system of adjustable louvers whereby the volume of air flowing through the heat exchange apparatus may be regulated to a fine degree in accordance with the varying requirements, the louvers being simple in construction, light in weight, mechanically strong and efficient in operation.

For a consideration of what we consider to be novel and our invention, attention is directed to the following description and the claims appended thereto, in connection with the accompanying drawings.

Figure 4:
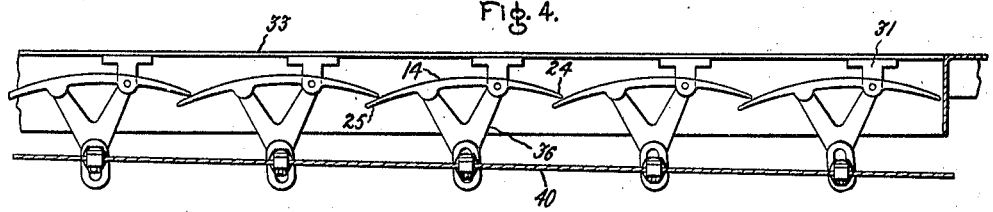
Figure 5:
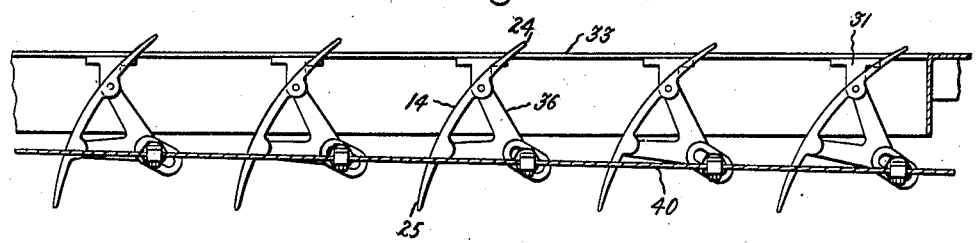
Figure 3:
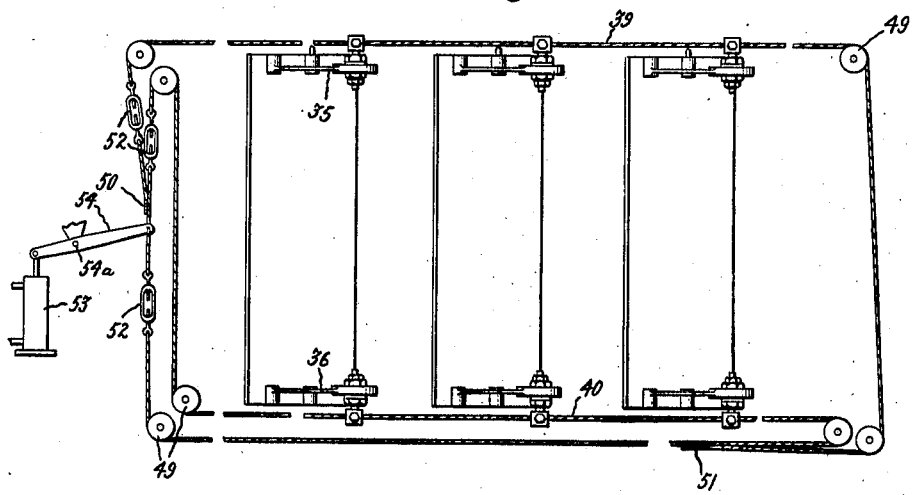

Referring to the drawings, Fig. 1 is a side view, partly in section, of a railway locomotive provided with a system of louvers of our invention; Fig. 2 is a perspective view, partly in section, of one of the blades of the inlet louver assembly; Fig. 3 is an elevational view of an assembly of a plurality of blades as shown in Fig. 2; Fig. 4 is a plan view showing an assembly of inlet louvers in the closed position; Fig. 5 is a plan view of an assembly of inlet louvers in an opened position; Fig. 6 is a cross-sectional view of the blade shown in Fig. 2 taken along the line 6—6; Fig. 7 is a perspective view partly in section showing a modified form of our invention as specifically adapted for the discharge opening; Fig. 8 is a sectional view of one of the louver blades shown in Fig. 7.

Referring to the drawings, in Fig. 1 we have indicated a section of locomotive embodying a heat exchanger compartment. As shown, the locomotive comprises a vehicle having side walls 10 and 11 and a roof 12. Suitable heat exchangers or condenser units 13 which may be provided for the purpose of condensing the turbine exhaust fluid, are mounted in the compartment adjacent the opposite side walls. The side walls are provided with openings adjacent the condenser units having a plurality of vertically arranged louver blades 14 mounted therein for controlling the flow of cooling air from the exterior of the vehicle to the cooling surfaces of the heat exchangers. The cooling air, after having passed in contact with the heat exchanger surfaces is allowed to pass from the compartment through an opening in the roof in which opening a plurality of louver blades 15 are transversely mounted.

The louver blades 14 for controlling the air inlet to the heat exchange compartment are shown in greater detail in Figs. 2-6, inclusive. Each blade comprises a pair of thin webs 16 and 17 preferably of light weight metal such as aluminum or an alloy thereof. The blade is arcuate in transverse section, as is more clearly seen in Fig. 6, the inner web thereof having a larger radius of curvature than the outer web such that while the two webs are spaced apart in the mid-section, they adjoin at the parallel side edges. The blades are suitably curved so as to offer a minimum of resistance to the air flow through the louver assembly and to increase the efficiency of the cooling system. The webs are secured as by rivets 18 at their opposite ends to arcuately shaped spacer blocks 19 and 20 having the same radius of curvature on the inner and outer sides as the webs secured thereto. Connecting the spacer blocks and extending longitudinally of the blade between the webs are spaced apart stiffener or spacer members 21 and 22 to which the webs 16 and 17 may be secured as by rivets 23. The webs may be secured together along their adjoining leading and trailing edges 24 and 25 respectively in any suitable manner such as by soldering or welding to form a unitary blade structure possessing great mechanical strength and capable of withstanding the severe conditions encountered in locomotive operation.

The louver blades are adapted to be pivotally supported in the vehicle side wall openings. From the upper spacer block and eccentrically positioned with respect to the longitudinal axis of the blade and toward the leading edge 24 thereof extends a pivot pin 26 which is adapted to cooperate within the bearing 27 secured, as by welding, to a bracket 28 depending from a frame member 29 extending along the upper edge of the side wall opening. The lower end of the blade is pivotally supported upon a pivot pin 30 extending from bracket 31 secured as by bolts 32 to a frame member 33 extending along the lower edge of the side wall opening. A bearing cup 34 adapted to cooperatively fit over the pivot pin 30 is provided in the lower spacer block 20 of the blade in axial alignment with the upper pivot pin 26. By the inverted arrangement of the pivot bearings 27 and 34 as shown, the accumulation of dust and water in the sockets is minimized. The pivotal axis divides the blade into a relatively small leading surface and a relatively larger trailing surface. The areas are so proportioned that when the blade is adjusted the leading edge thereof projects outwardly from the outer surface of the side wall of the locomotive vehicle into a relatively high velocity air current traveling parallel with the side wall, the forces acting upon the surface of the blade on opposite sides of the pivotal axis of the blade substantially balance each other.

For controlling the position of the louver blades with respect to the plane of the side wall of the locomotive, bifurcated arms 35 and 36 extend perpendicularly from the inner surface of the blade, from the upper and lower spacer blocks 19 and 20 respectively. The ends of the arms 35 and 36 are provided with elongate slots 37 and 38 respectively into which slots control rods or cables 39 and 40 may be adjustably secured as by clamping means 41 and 42 respectively. The clamps each comprise jaws 43 and 44, while pins 45 integral with jaw elements 44 extend through bushings 46 which are fastened in the elongate slots by nuts 47. The pins are loosely retained in the bushings by locked nuts 48 so that they are freely rotatable therein.

In the preferred arrangement, a plurality of blades are mounted in the opening in the side wall of the locomotive side by side in such a manner that when they are in the closed position as shown in Fig. 4 the leading edge of each blade slightly overlaps the trailing edge of the preceding blade by a slight amount so that a substantially tight surface is obtained. This position is desirable when the locomotive is standing idle when the condenser units may be protected from driving rains, snow or dust laden air. As shown in Fig. 3, the blades are connected together in series relationship by control cables 39 and 40 which are clamped to the arms 35 and 36. The cables are movably arranged over pulleys 49 suitably mounted on the locomotive framework and connected together as at 50 and 51, suitable turnbuckles 52 are provided in the cables for adjusting the tension thereof. It will be noted that by the cable arrangement shown, the sections secured to the opposite ends of the series of blades will be moved simultaneously by like amounts in some directions upon actuation by a suitable operating motor as shown at 53. The positive positioning as well as the retention of the blades is thereby assured as against the forces of the air flow acting upon the surfaces thereof. The operating motor may be connected to the cable as shown by means of a lever 54 pivoted to a stationary part at 54a. Any suitable control apparatus may be provided for the motor for actuating the louvers in accordance with conditions of temperature, train speed, or operating conditions of the locomotive as desired.

In response to a movement of the control cables to the right, as viewed in Figs. 4 and 5, the blades are caused to pivot, projecting the leading edges 24 thereof beyond the plane of the side wall of the locomotive and moving the trailing edges 25 inwardly toward the condenser units. Provision is made for progressively varying the degree of opening of the respective blades of the assembly in response to a predetermined movement of the cables to insure a uniform flow of air throughout the length of the opening. Such adjustment is desirable, particularly when the locomotive is traveling at a high rate of speed when the air flow is substantially parallel with the side walls of the locomotive. While operating at such speed, if the leading edges of all of the blades of the assembly were projected beyond the side wall surface a like amount, the few louvers toward the front of the assembly would carry a maximum supply of air to the condenser units while the louver blades toward the rear of the assembly would be starved or precluded from intercepting and conducting to the rear condenser units the same proportion of air. Such an unequal distribution of air flow to the heat exchange apparatus would result in the imperfect functioning thereof. According to the invention, the cables are fastened in the elongate slots of the arms in a graduated manner so that the blades toward the front, or at the right as shown in Figs. 4 and 5, are connected to the cable by a longer lever arm than those toward the rear, or at the left. Connected in this manner, a predetermined movement of the cable will pivot each of the blades from the front to the rear through progressively greater angles, projecting the leading edges of the respective blades progressively greater amounts beyond the plane of the outer surface of the cab as shown in Fig. 5. In the position of adjustment shown, each blade is extended slightly farther out into the air flow than the preceding blade and each intercepts a proportionate amount of air which is directed toward the heat exchange apparatus in an equal distribution from one end thereof to the other.

Another form of the invention is shown in Figs. 7 and 8 as specifically adapted for the cooling air discharge opening provided in this instance in the roof of the heat exchanger compartment of the locomotive. Similar to the inlet louver construction, each blade comprises a pair of webs 55 and 56 preferably of relatively thin metal such as aluminum or an alloy thereof. As viewed in cross section, see Fig. 8, this blade is also arcuate in transverse section so as to direct the flow of air rearwardly, or in the relative direction of air flow on the outside of the vehicle. The blades are also streamlined so as to offer a minimum of resistance to the air flow through the assembly, the webs thereof being spaced apart in the mid-section and joined together at the leading and trailing edges 57 and 58 respectively in any suitable manner, such as by soldering or welding. Instead of using two separate webs as in the case of the inlet louvers, the webs may comprise a continuous sheet bent back upon itself, the two portions thereof being spaced apart in the mid-section. The webs are secured at the opposite ends to spacer blocks 59 and 60 and to a stiffening member 61 extending longitudinally between the end blocks and between the spaced apart webs.

As in the case of the inlet louver assembly, the outlet louvers are preferably adjustably mounted in the air discharge opening. The ends of the spacer blocks are provided with bearing recesses 62 into which pivot pins integral with the brackets 63 may be inserted. The brackets 63 may be secured as desired to frame members 64 extending along the sides of the opening. For controlling the position of the blades, arms 65 are provided integral with the end spacer blocks 59 and 60 extending perpendicularly from the surface of the blades to the ends of which arms a control cable 66 may be secured by suitable clamping means 67. The clamping means 67 is similar in all respects with the clamping devices 41 and 42 described above in detail in connection with the inlet louvers. The control cable in this instance may be a continuous one arranged substantially as shown on pulleys 68 mounted on the locomotive framework. Turnbuckles 69 may be provided in various sections of the cable for taking up the slack therein and adjusting the tension thereof. The louver blades are adjusted upon actuation of the cable by means of an operating motor 70 connected to the cable through a suitable lever connection 71 which may be pivoted at 72 to a stationary part of the framework, not shown. By the arrangement of the cable, as shown, the sections secured to the opposite ends of the louver blades are moved simultaneously by like amounts and in the same direction so that the blades are thus positively moved and accurately retained in the adjusted position against the forces acting upon the surfaces of the blades due to the air flow therebetween. The operating motor 70 may be connected to any suitable control means, not shown, for adjusting the blades in accordance with conditions of temperature, weather, train speed or other operating conditions of the locomotive as desired.

Having described the method of operation of our invention together with the apparatus which we now consider to represent the best embodiment thereof, we desire to have it understood that the specific constructions shown are only illustrative and that the invention may be carried out by other means.

What we claim as new and desire to secure by Letters Patent of the United States is:

1. Air flow control apparatus comprising a plurality of longitudinal louver blades, said blades pivotally mounted at opposite ends for adjustable movement from a closed to a predetermined opened position, lever arms extending substantially perpendicularly from the surfaces of said blades adjacent the opposite ends thereof, cable means pivotally secured to said arms along corresponding ends of said blades, and motor means operatively connected to said cable means for adjusting said blades and retaining said blades in a predetermined position of adjustment.

2. Air flow control apparatus comprising a plurality of longitudinal louver blades arranged side by side in a slightly overlapping relationship, said blades each comprising a pair of webs of relatively thin metal joined at the edges thereof and spaced apart in the midsection, transverse spacer blocks in the ends of said blades, stiffening means extending longitudinally of said blades between said spaced apart webs, said blades being transversely curved in the direction of air flow between said blades, pivot supporting means at opposite ends of said blades, lever arms extending perpendicularly from the surfaces of said blades at the opposite ends thereof, cable means connecting said arms at corresponding ends of said blades, motor means connected to said cable means for positioning said blades.

3. In a railway vehicle having a heat exchanger compartment therein and an opening in a wall of said vehicle for the circulation of cooling air through said compartment, the combination including a plurality of longitudinal louver blades arranged side by side in said opening, said blades being pivotally supported at opposite ends for adjustable movement from an overlapping closed position to a predetermined opened position, said blades being transversely curved in the direction of air flow between said blades, lever arms extending outwardly from the corresponding surfaces at opposite ends of said blades, cable means pivotally secured to said lever arms at corresponding ends of said blades and motor means connected to said cable means for controlling the movement thereof.

4. In a railway locomotive having an elastic fluid condenser compartment therein and an opening in the side wall of said vehicle for admitting cooling air into said compartment, the combination including a plurality of longitudinal louver blades vertically arranged in said opening, said blades being pivotally supported at opposite ends for adjustable movement from an overlapping closed to a predetermined opened position, said louver blades being of streamlined, cross-sectional shape and transversely curved in the direction of the air flow into said compartment while said locomotive is in motion, lever arms extending substantially perpendicularly from the inner surfaces of said blades at the opposite ends thereof, cable means pivotally secured to said lever arms for positioning said blades, means whereby the effective length of the lever arm between said blades and said cable means may be adjustably varied for causing said blades to be projected beyond the side wall of said locomotive in graduated amounts upon a predetermined movement of said cable means and motor means for controlling the movement of said cable means.

5. Air flow control apparatus comprising a plurality of longitudinal louver blades arranged side by side in a slightly overlapping relationship, said blades each comprising a pair of webs of relatively thin metal joined at the edges thereof and spaced apart in the midsection, transverse spacer blocks in the ends of said blades, stiffening means extending longitudinally of said blades between said spaced apart webs, said blades being transversely curved in the direction of air flow between said blades, pivot means at the ends of said blades for adjustably supporting said blades from a closed to an opened position, a cable connected to the upper ends of said blades and a cable connected to the lower ends of said blades, and motor means operatively connected to said cables for adjusting the position of said louver blades and retaining said blades in the adjusted position.

6. Air flow control apparatus comprising a plurality of longitudinal louver blades arranged side by side in a slightly overlapping relationship, said blades each comprising a pair of webs of relatively thin metal joined at the edges thereof and spaced apart in the midsection, transverse spacer blocks in the ends of said blades, stiffening means extending longitudinally of said blades between said spaced apart webs, said blades being transversely curved in the direction of air flow between said blades, pivot means at the ends of said blades for adjustably supporting said blades from said overlapping position to a predetermined opened position, a continuous cable means for controlling the position of said blades, portions of said continuous cable so connected to the opposite ends of said blades for applying substantially identical forces to said opposite ends and motor means connected with said cable for controlling the movement thereof.

7. Air flow control apparatus for regulating the flow of cooling air through steam condensing apparatus comprising a plurality of longitudinal blades arranged side by side in a slightly overlapping relationship, said blades each comprising a pair of webs of relatively thin metal joined at the edges and spaced apart in the midsection, transverse spacer blocks in the ends of said blades between said webs, stiffening members extending longitudinally of said blades between said spaced apart webs and said spacer blocks with said blades being transversely curved in the direction of air flow through said control apparatus and pivotally supported at the ends permitting adjustment of said blades from a closed to an opened position, the pivotal axis being such that the forces due to air flow acting on the surface of the blade on either side of said axis substantially balance each other, arms extending outwardly from the surfaces at the ends of said blades and secured to the spacer blocks, cables secured to said arms for controlling the position of said blades, and means whereby the effective length of the lever arm between said cables and said blades may be adjustably varied.

8. In a railway vehicle having a heat exchanger compartment therein and an opening in the side wall of said vehicle for admitting cooling air into said compartment, a plurality of longitudinal louver blades vertically arranged side by side in said opening, said blades being pivotally supported at opposite ends for the adjustment of said blades from a closed to a predetermined opened position, said louver blades being transversely curved in the direction of the air flow into said compartment when said vehicle is in motion, the pivotal axis of said blades dividing the surfaces thereof into a relatively small leading surface and a relatively large trailing surface of such relative proportions that the forces due to the air flow acting upon the surface of the blade substantially balance on opposite sides of said axis and means for adjustably retaining said blades in a predetermined opened position.

9. In a railway vehicle having a heat exchanger compartment therein, an opening in the side wall of said vehicle for admitting cooling air into said compartment, a plurality of longitudinal louver blades vertically arranged side by side in said opening in a slightly overlapping relationship and pivotally adjustable from said overlapping position to a predetermined open position, said blades each comprising a pair of smooth surfaced webs of relatively thin metal joined at the side edges thereof and spaced apart in the midsection, transverse spacer blocks in the ends of said blades, stiffening members extending longitudinally of said blades between said spaced apart webs, said blades being transversely curved in the direction of air flow between said blades, pivot means arranged in the opposite ends of said blades, the axis of said pivots dividing the surface of each of said blades into a relatively small leading and a relatively large trailing surface whereby the forces due to air flow acting upon said blades are substantially balanced, means secured to said blades for moving said blades from a closed to an opened position.

ROBERT G. ANDERSON.
KARL J. AHNELL.
TOWNSEND R. GOLDSMITH.